No. 864,195. PATENTED AUG. 27, 1907.
G. J. B. RODWELL.
APPARATUS FOR MAKING RUBBER STAMPS.
APPLICATION FILED AUG. 3, 1906.
2 SHEETS—SHEET 1.
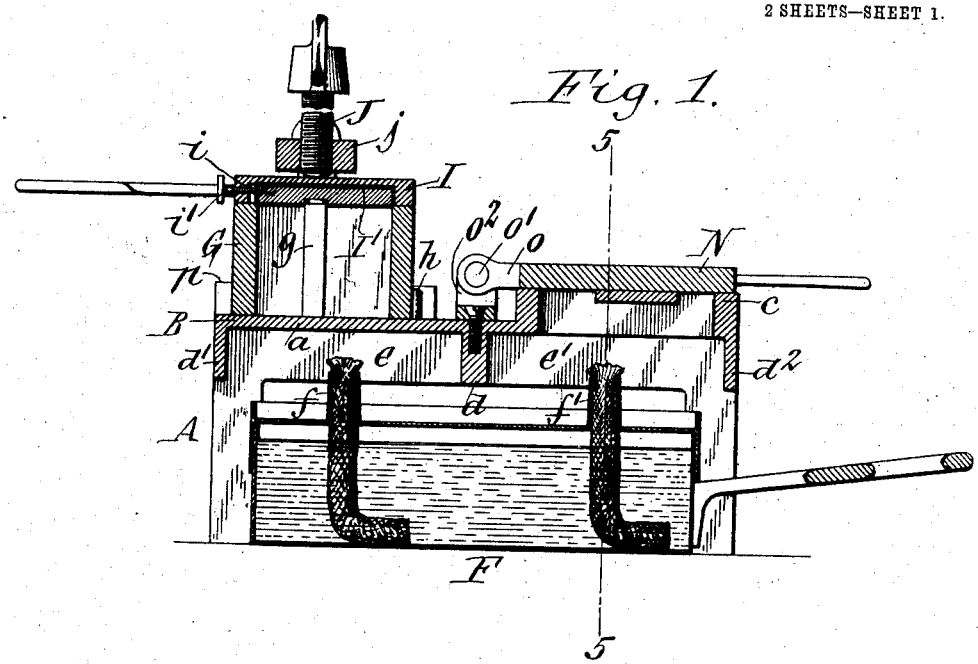
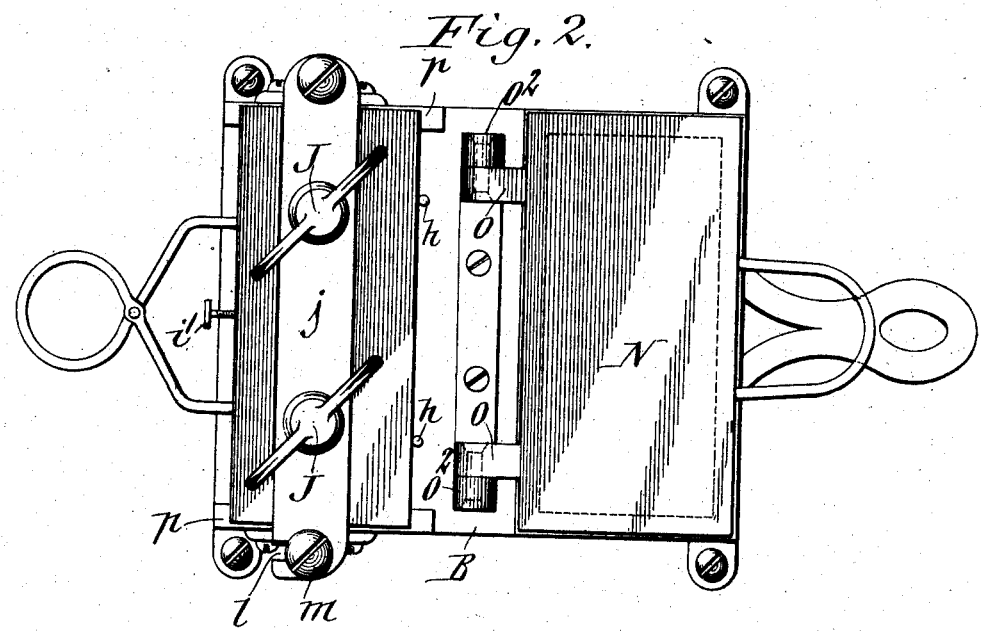

No. 864,195. PATENTED AUG. 27, 1907.
G. J. B. RODWELL.
APPARATUS FOR MAKING RUBBER STAMPS.
APPLICATION FILED AUG. 3, 1906.
2 SHEETS—SHEET 2.
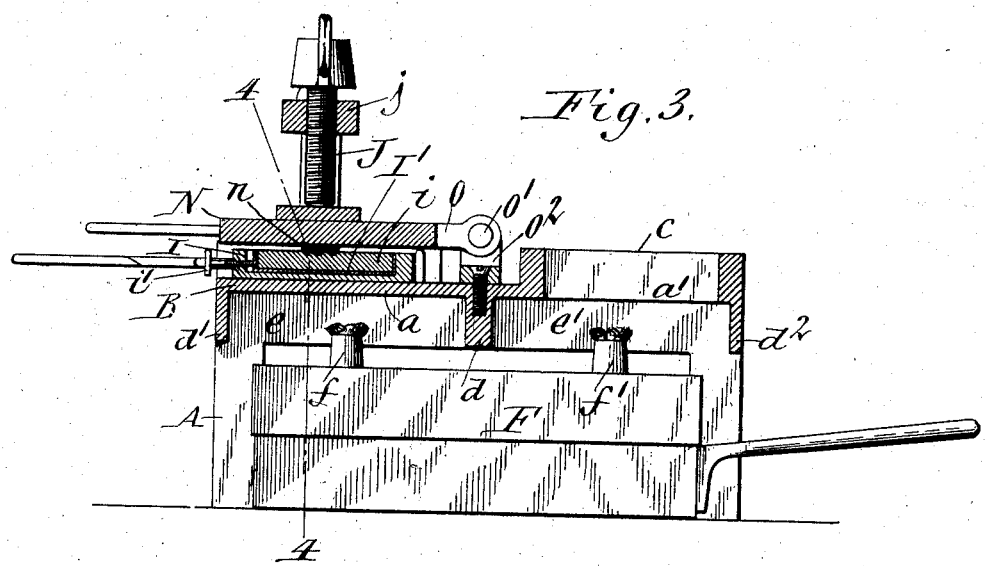
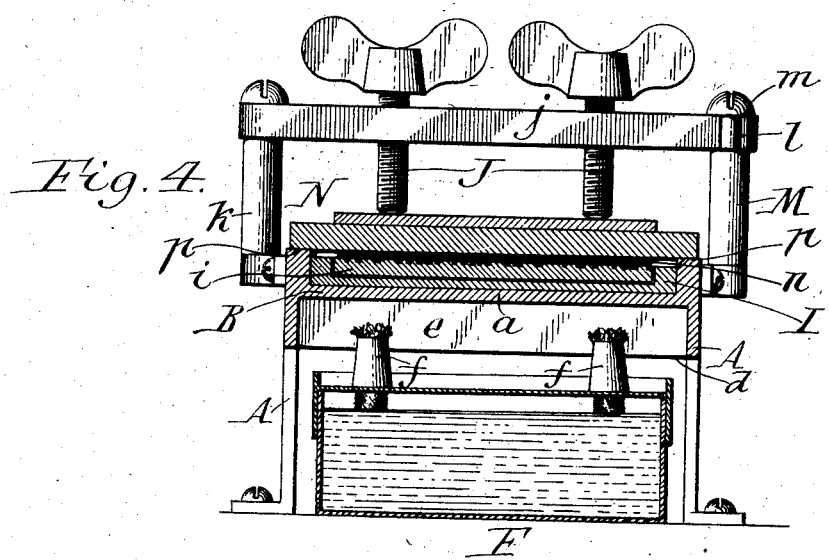
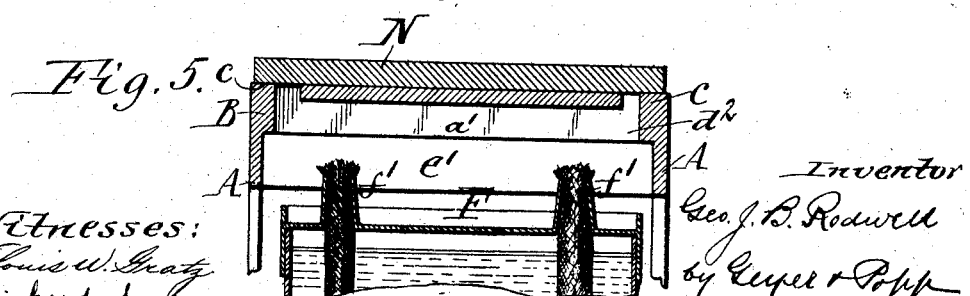
Witnesses:
Louis W. Gratz
Richard Sommer
Inventor
Geo. J. B. Rodwell
by Geyer & Popp
Attorneys

UNITED STATES PATENT OFFICE.

GEORGE J. B. RODWELL, OF CHICAGO, ILLINOIS, ASSIGNOR OF ONE-HALF TO TIMMINS & BUTLER, OF BUFFALO, NEW YORK.

APPARATUS FOR MAKING RUBBER STAMPS.

No. 864,195.     Specification of Letters Patent.     Patented Aug. 27, 1907.

Application filed August 3, 1906. Serial No. 328,984.

*To all whom it may concern:*

Be it known that I, GEORGE J. B. RODWELL, a subject of the King of England, residing at Chicago, in the county of Cook and State of Illinois, have invented a new and useful Improvement in Apparatus for Making Rubber Stamps, of which the following is a specification.

This invention relates to an apparatus for making rubber stamps and has the object to produce an apparatus for this purpose whereby perfect stamps may be made more expeditiously than has been possible heretofore.

In the accompanying drawings consisting of two sheets: Figure 1 is a vertical longitudinal section of my improved stamp making apparatus, showing the parts in position for producing the impression of the type on the molding paste in the flask. Fig. 2 is a top plan view thereof. Fig. 3 is a view similar to Fig. 1 but showing the parts in position for vulcanizing the rubber in the matrix of the flask. Fig. 4 is a vertical cross section in line 4—4 Fig. 3. Fig. 5 is a fragmentary cross section in line 5—5 Fig. 1.

Similar letters of reference indicate corresponding parts throughout the several views.

The main frame of the apparatus consists essentially of two upright longitudinal side pieces A, A and a horizontal table B connecting the upper ends of the side pieces. The front part $a$ of this table is solid or imperforate but its rear part has an opening $a^1$ which is bounded by an upwardly projecting flange $c$. On its underside the table is provided centrally with a depending transverse rib or flange $d$ and at its front and rear ends with depending transverse ribs or flanges $d^1$, $d^2$ which ribs together with the side pieces of the frame form front and rear heating chambers $e$, $e^1$, as shown in Figs. 1 and 3.

F represents a lamp arranged between the side pieces of the frame and having front and rear burners $f$ $f^1$ which project upwardly into the front and rear heating chambers, respectively, so that their flames heat the same and the parts resting thereon.

G represents the chase or frame in which the type $g$ are locked from which the impression is obtained for producing the matrix from which the rubber stamp is made. This chase is temporarily placed on the front part of the table with its rear side engaging stops or gages $h$ on the table and with the face of its type turned upwardly.

I represents a molding flask which is filled with the molding cement or paste $i$. While the chase of type is resting on the front part of the table an impression of the same is produced in the molding paste by inverting the flask and pressing the molding paste therein downwardly against the face of the type. This pressure may be produced by any suitable means but preferably by means of one or more vertical pressure screws J working in a cross bar $j$ and bearing at their lower ends against the backside of the flask and provided at their upper ends with wings or finger pieces for turning the same. For convenience in manipulating the apparatus the cross bar is preferably movable laterally or horizontally over the front part of the table or to one side thereof by pivoting the bar at one end to a post $k$ rising from one side of the frame and engaging a notch $l$ in its opposite end under the shoulder or head $m$ of a post M which rises from the opposite side of the frame. After the impression or matrix of the type has thus been made in the molding paste of the flask the chase is removed from the table and the flask is put in its place with the matrix facing upwardly. The heat from the front burners passing through the solid front part of the table causes the plastic mold resting thereon to dry quickly preparatory to utilizing the same for making the rubber stamp. After the mold has dried sufficiently a piece of unvulcanized rubber $n$ is placed over the impression or matrix of the same and then a heating or vulcanizing plate or follower N is pressed down upon the rubber and held there a sufficient length of time to cause the rubber to melt and conform to the matrix or mold and become vulcanized. This plate is heated while the formation and drying of the mold is taking place and preferably by placing the same over the opening in the rear part of the table so as to be heated by the flame of the rear burners.

The heating plate is preferably pivoted at one of its transverse edges to the upper side of the table between the opening $a^1$ in the rear part thereof and the mold on the front part thereof so that the heating plate can be conveniently swung from its heat receiving position over the opening $a^1$ to its heat delivering position over the rubber on the mold. The pivotal connection between the heating plate and the table preferably consists of a pair of lugs $o$ arranged on said plate and connected by pintles or rivets $o^1$ with lugs $o^2$ rising from the table, as shown in Figs. 1, 2 and 3. While being heated the plate N engages along its entire margin with the flange $c$ around the opening $a^1$, as shown in Figs. 1 and 5, whereby the heat is confined in the rear heating chamber and caused to heat the plate with a minimum of waste. After the heating plate is swung forward into its vulcanizing position the flame of the rear burners may be extinguished for the sake of economy.

Owing to the pivotal connection between the heating plate and the table the former does not engage all parts of the rubber over the matrix at the same time but engages the same first at its rear edge and then gradually extends its engagement therewith from the rear edge to the front edge with a rolling or tilting motion. By this means any air which may be present in the mold is gradually squeezed out of the same from rear to front, thereby preventing the air from injuring the mold and producing a rubber stamp which is perfectly solid and free from imperfections such as air holes and irregular or incomplete reproduction in rubber of the mold or matrix which is liable to occur when the heating plate is pressed simultaneously against all parts of the rubber because of the liability of trapping and imprisoning air in parts of the mold. Furthermore by this circular motion of the heating plate, the pressure of the same is applied gradually to the rubber, thereby enabling the required pressure to be exerted with less power than has been heretofore necessary for this purpose. The heating plate is pressed against the rubber by means of the screws J which engage with the back of the heating plate, as shown in Figs. 3 and 4. The downward movement of the heating plate is limited by engaging the ends of the same with two stops, gages or flanges $p$ which are arranged on opposite sides of the front part of the table, as shown in Fig. 4, thereby insuring a uniform thickness throughout the rubber stamp.

After the stamp has been vulcanized the same is removed from the flask and mounted on a handle in any suitable and well known manner. Heat is applied to the upperside of the rubber and the underside of the flask at the same time while vulcanizing the rubber whereby this operation is performed in less time than heretofore.

By separating the front and rear heating chambers in the manner described it is possible to confine the heat of the front and rear burners to the particular space for which they are intended, thus permitting the rear burners to be extinguished when not required without interfering with the front burners, and economizing in the consumption of oil.

Instead of putting the molding cement or paste directly in the flask the same is preferably put in a pan or tray $I^1$ which is secured in the flask by a clamping screw $i^1$. By this means a number of the pans or trays may be filled with the molding paste or cement at the one time and kept in stock ready for use one at a time in the flask when the demands of the business render it desirable not to lose time in filling a flask with molding cement just before taking an impression.

As a whole this apparatus is very compact, simple in construction, easily operated and not liable to get out of order.

I claim as my invention:

1. An apparatus for making rubber stamps comprising a flask, and a tray or pan adapted to be placed in said flask and to receive a molding paste or cement, substantially as set forth.

2. An apparatus for making rubber stamps comprising a flask, a tray or pan adapted to be placed in said flask and to receive a molding paste or cement, and a clamping device for holding said tray or pan in the flask, substantially as set forth.

3. An apparatus for making rubber stamps comprising a flask, a tray or pan adapted to be placed in said flask and to receive a molding paste or cement, and a clamping screw arranged on the flask and adapted to bear against said tray or pan substantially as set forth.

4. An apparatus for making rubber stamps comprising a table, means for molding and vulcanizing arranged at the front part of the table, and means for heating a vulcanizing plate at the rear part of the table, substantially as set forth.

5. An apparatus for making rubber stamps comprising a table, a lamp arranged under the table, an impression and vulcanizing press arranged over the front part of the table, and a heating plate movable from the rear part of the table to the front part thereof, substantially as set forth.

6. An apparatus for making rubber stamps comprising a table having a solid front part and an opening in its rear part and adapted to receive burners below its front and rear parts, the upperside of said front part of the table being adapted to receive a type chase and a molding flask, and said upper side of the rear part being adapted to receive a heating plate, substantially as set forth.

7. An apparatus for making rubber stamps comprising a table having its underside constructed to form front and rear heating chambers, molding and vulcanizing means adapted to be placed over the front heating chamber, and a vulcanizing plate adapted to be placed over the rear heating chamber, substantially as set forth.

8. An apparatus for making rubber stamps comprising a support for the molding flask, a plate adapted to press a piece of rubber against the matrix of said mold, and means for causing said plate to first press against said rubber at one edge thereof and then gradually extend its engagement therewith toward the opposite edge of the rubber, substantially as set forth.

9. An apparatus for making rubber stamps comprising a support for the molding flask, and a pivoted plate adapted to press a piece of rubber against the matrix of said mold, substantially as set forth.

10. An apparatus for making rubber stamps comprising a support for the molding flask, and a plate pivoted to said support on one side of said flask, and adapted to press a piece of rubber against the matrix thereof, substantially as set forth.

11. An apparatus for making rubber stamps comprising a molding flask, a heater, and a pivoted presser plate adapted to be swung over either said heater or said flask, substantially as set forth.

12. An apparatus for making rubber stamps comprising a table adapted to support a molding flask at one end and provided at its opposite end with means for heating a presser plate, and a presser plate pivoted to the central part of said table and adapted to be swung over either the heating means or said flask, substantially as set forth.

13. An apparatus for making rubber stamps comprising a table provided with a solid front part and having an opening in its rear part, heaters or burners arranged under the front and rear parts of said table, a molding flask adapted to rest on the front part of the table with its matrix facing upwardly, a heating plate pivoted on the central part of the table to swing vertically either over said opening or over the matrix of the mold, and a presser device operating to move said plate toward said matrix and vulcanize a piece of rubber placed between the same, substantially as set forth.

Witness my hand this 25th day of July, 1906.

GEORGE J. B. RODWELL.

Witnesses:
 THEO. L. POPP,
 H. W. TIMMINS.